United States Patent [19]

Oohori

[11] Patent Number: 4,698,536
[45] Date of Patent: Oct. 6, 1987

[54] BUILT-IN WHEEL SPEED SENSOR STRUCTURE FOR A CAR

[75] Inventor: Harumi Oohori, Toyota, Japan

[73] Assignee: Toyota Jidosha Kabushiki Kaisha, Aichi, Japan

[21] Appl. No.: 852,759

[22] Filed: Apr. 16, 1986

[30] Foreign Application Priority Data

Apr. 16, 1985 [JP] Japan .......................... 60-055535[U]

[51] Int. Cl.⁴ ........................................... H02K 17/42
[52] U.S. Cl. ................................ 310/168; 188/181 A; 310/77; 324/173
[58] Field of Search ................... 310/67 R, 67 A, 168, 310/77, 93, 68; 188/181 A, 181 C, 181 R; 324/164, 173, 174, 208

[56] References Cited

U.S. PATENT DOCUMENTS

| | | | |
|---|---|---|---|
| 3,626,226 | 12/1971 | Pauwels | 310/168 |
| 3,626,227 | 12/1971 | Ritsema | 310/168 |
| 3,626,228 | 12/1971 | Jordan | 310/168 |
| 3,961,215 | 6/1976 | Gee et al. | 310/168 |
| 4,013,954 | 3/1977 | Deem et al. | 324/173 |
| 4,017,756 | 4/1977 | Davidson | 310/168 |
| 4,456,309 | 6/1984 | Rath | 188/181 A |

Primary Examiner—Patrick R. Salce
Assistant Examiner—D. L. Rebsch
Attorney, Agent, or Firm—Parkhurst & Oliff

[57] ABSTRACT

A built-in wheel speed sensor structure having an internal gear-like sensor rotor integrally fixed to a tire and an electromagnetic car speed sensor fitted to an inner portion of a parking brake and facing the sensor rotor. The wheel speed sensor is supported by an anchor pin of the drum brake so that the sensor rotor may be positioned away from service holes for fastening bolts which have been bored into a brake drum.

4 Claims, 4 Drawing Figures

BUILT-IN WHEEL SPEED SENSOR STRUCTURE FOR A CAR

BACKGROUND OF THE INVENTION

A. Field of the Invention

This invention relates to a built-in wheel speed sensor structure for a vehicle having a mounted brake control device.

B. Description of the Prior Art

When an anti-lock brake control device is mounted to a car employing a drum brake, the present device relates to a built-in wheel speed sensor structure for a car wherein an electro-magnetic wheel speed sensor is internally fitted to and supported by the drum brake. Additionally, an internal gear-like sensor rotor corresponding to the sensor is integrally fixed to a rotary wheel in such a manner as to face the sensor.

Remarkable progress in the studies on friction characteristics between a running road surface and a tire of a car have been made in recent years. For example, we know that the friction characteristics vary according to a slip ratio between the road surface and the tire and attain the highest level when the slip ratio is about 20%.

An anti-lock brake system has been developed which controls the slip ratio to within about 20% at the time of braking the car. The anti-lock brake system has been fitted to several models of cars in order to prevent side slipping of the tires during abrupt braking action.

In general, the above-described anti-lock brake system comprises a wheel speed sensor, a computer and an actuator. The wheel speed sensor is disposed in the proximity of a rotary member, such as a wheel or a transmission, in order to detect the car speed based upon a car speed signal and the associated revolutions of the rotary member. The wheel speed signal detected by the wheel speed sensor is then sent to, and controlled by, the computer as a brake oil pressure instruction signal adapted to the wheel speed and subsequently sent to the actuator. The actuator in turn receives the signal from the computer, increases or decreases the brake oil pressure and controls the braking force to a suitable level.

The wheel speed sensor is supported at a fixed position of a car body in such a manner as to face an internal gear-like sensor rotor which is integrally fixed to the rotary member described above and which detects the change of the magnetic flux of a magnetic iron plate at the tip of the sensor due to the revolution of the sensor rotor as induction electromotive force of a coil which is incorporated therein.

In general, the wheel speed sensor and the sensor rotor are fitted to a differential-gear device or an output shaft of a transmission gear box and the like in front engine-rear drive type cars, but are seldom fitted to the rear part of the car body in front-engine-front-drive type cars (hereinafter referred to as "FF cars"). When they are fitted to the rear part of the car body, their fitting positions are unavoidably limited to the portions near the axle.

Accordingly, it presently is customary to fit the wheel speed sensor to a flange end of a bearing case which is built in a parking brake and to integrally fix the sensor rotor inside the drum in such a manner as to correspond to the wheel speed sensor thus fitted.

However, when the wheel speed sensor is fitted to a disc brake which is also equipped with a drum brake for parking, the prior art example described above, in which the wheel speed sensor is fitted to the end flange of the bearing case, involves the following problem. Namely, since a brake shoe which undergoes displacement in the proximity of the outer periphery of the bearing case is externally fitted, a predetermined gap must be secured between the brake shoe and the wheel speed sensor. When this gap is obtained by forming a notch on the brake shoe, the brake shoe itself is weakened.

Even if the reduction in strength of the brake shoe itself is eliminated by forming the notch on the brake shoe and then somehow reinforcing the brake shoe, the portion at which the wheel speed sensor is close to the center of the axle necessarily means that the sensor rotor which corresponds to the sensor must also be disposed close to the center of the axle. As a result, the sensor rotor would overlap with the position of fitting bolts for the bearing case, thus making fastening impossible when an impact wrench or the like is inserted through a service hole bored in the brake drum.

SUMMARY OF THE INVENTION

Accordingly, it is an object of the present invention to solve the problems heretofore associated with the built-in wheel speed sensor structures for cars.

Another object is to provide a built-in wheel speed sensor structure for a car which utilizes effectively the inner dead space of the parking brake, making it possible to fit the wheel speed sensor without reducing the strength of the brake components and allows the ease of maintenance and inspection of other components to be fitted into the brake drum.

Another object of the invention is to provide an extremely advantageous device for the field of electronic control appliances in the automobile industry.

The present invention accomplishes the above objects and solves the problems described above by integrally fixing an internal gear-like sensor rotor to a wheel and internally supporting an electromagnetic wheel speed sensor by an anchor pin of a parking brake in such a manner that the sensor motor is positioned away from service holes for fastening bolts which are bored in a brake drum.

DETAILED DESCRIPTION OF THE INVENTION

Figure 1:
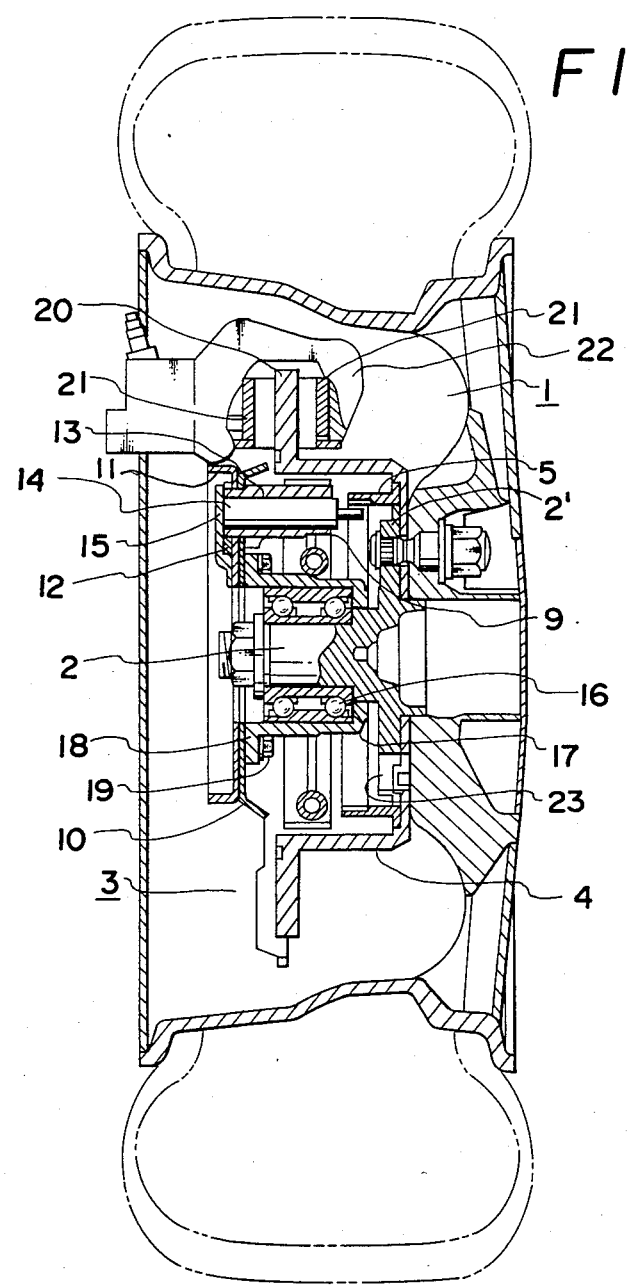
FIG. 1 is a sectional view of the invention.
Figure 2:
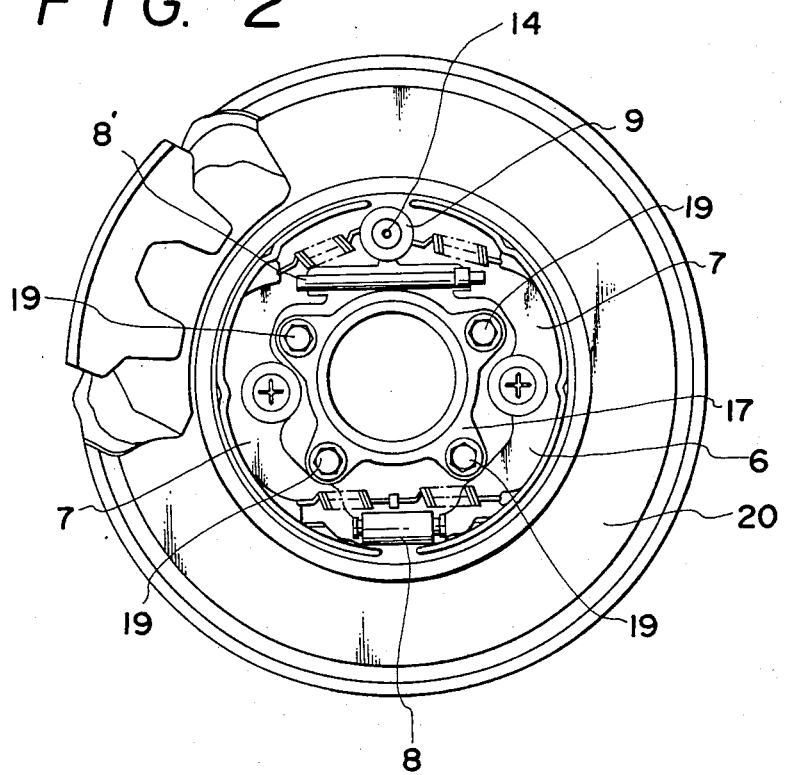
FIG. 2 is a front view of a brake from which a brake drum portion is removed.
Figure 3:
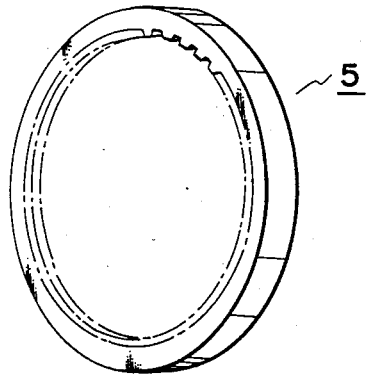
FIG. 3 is a perspective view of a sensor rotor.
Figure 4:
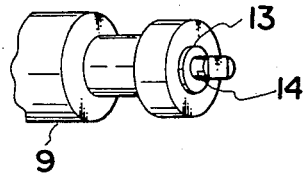
FIG. 4 is a perspective view showing the fitting state of a sensor

A first embodiment of the present invention will be described with reference to FIGS. 1-4.

Reference numeral 1 represents a built-in car speed sensor structure of the present invention and illustrates an embodiment in which a disc brake of a drum-in type is fitted to a rear driven wheel of a front-engine, front-wheel drive (FF) vehicle with a transverse-mounted engine.

In the built-in wheel speed sensor structure 1 described above, an internal gear-like sensor rotor 5 is integrally fixed to the inner part of a brake drum portion 4 formed with a disk rotor of a disk brake 3 and/or a hub 2' of a rear axle shaft 2 (FIG. 2) is also built in.

The parking brake assembly 6 comprises brake shoes 7, struts 8, 8' and an anchor pin 9. These members are supported by a backing plate 10 (FIG. 1), a support bracket 11 and a reinforcing member 12. Furthermore, the anchor pin 9 is hollow, and an electromagnetic wheel speed sensor 14 is inserted into this hollow portion 13. The sensor 14 is integrally fixed at its base end to a bracket 15 by bolt means, in such a manner that the magnet at its tip faces the internal gear-like wheel speed sensor rotor 5 described above. The sensor 14 and bracket 15 are supported on a support bracket 11 or the like by bolts (not shown) or the like.

The base end of the rear axle shaft 2 is supported by a bearing case 17 through a bearing 16. A base end flange 18 of the bearing case 17 is fixed to, and supported by, a carrier (not shown) by bolts 19. The backing plate 10 and support bracket 11 are interposed between and fastened by the bearing case 17 and the carrier.

The disk rotor of the disc brake is disposed in such a manner as to extend around the outer peripheral portion at the end portion of the brake drum 4. The disc rotor 20 is integrally formed with the brake drum 4. Calipers 22 having brake pads 21 are externally fitted to a part of the disc rotor 20. A predetermined number of service holes 23 corresponding to the fitting bolts 19 for fitting the bearing case 17 are formed on the inner diameter side of the fitting portion of the brake drum 4.

In the construction described above, when a driver of the car senses any danger during driving and subsequently applies a pedal force, the braking force is converted to an oil pressure force through a master cylinder (not shown) and urges the calipers 22 and brake pads 21 towards the disc rotor 20 of the disc brake 3 to deter the revolution of the disc rotor 20.

In the present invention, the revolution of the disc rotor 20 is detected by the electromagnetic wheel speed sensor 14. The wheel speed sensor 14 is disposed in such a manner as to face the sensor rotor 5 during the revolution of the sensor rotor 5 inside the brake drum 4.

The revolution speed of the wheel then is sent as a wheel speed signal to the computer provided in the vehicle. The computer determines a suitable brake oil pressure and sends a control signal to the actuator.

The actuator mitigates the brake oil pressure just before the brake locks and optimally controls the friction characteristics between the road surface and the tire.

Since the electromagnetic wheel speed sensor 14 is internally fitted to and supported by the anchor pin 9, it does not affect the brake shoes 7 that undergo displacement inside the brake drum 4, and hence the inner dead space of the brake drum 4 can be utilized effectively.

The present invention provides excellent fundamental utilization of dead space inside the brake drum of the drum brake and permits the wheel speed sensor to be fitted to cars employing the drum brake without reducing the strength of the brake components, and allows the ease of maintenance and inspection of other components to be fitted inside the brake drum.

In other words, since the internal gear-like sensor rotor is integrally fixed to the wheel and the electromagnetic wheel speed sensor is internally fitted to and supported by the anchor pin of the drum brake in such a manner as to face the sensor rotor, there is no need to cut notches on the brake shoes, like the prior art devices in which the wheel speed sensor is fitted to the end flange of the bearing case. Therefore, the strength of the brake shoe itself is maintained at the same level as in the prior art devices.

Furthermore, since the wheel speed sensor is supported inside the anchor pin of the drum brake, the internal gear-like sensor rotor which is disposed on the brake drum so as to face the wheel speed sensor can be disposed away from the service holes of the bolts for fastening the bearing case which are bored in the brake drum.

It would be obvious to those skilled in the art that the present invention is not particularly limited to the embodiment described above but that other various embodiments can also naturally be practiced.

What is claimed is:

1. A built-in wheel speed sensor structure for a vehicle, comprising:
   (a) an internal gear-like sensor rotor fixed to wheel means, said wheel means rotating integrally with a tire; and
   (b) an electromagnetic wheel speed sensor fitted to a fixed portion of a parking brake means, said wheel speed sensor being disposed in an anchor pin on a bearing case, said wheel speed sensor fixed in such a manner as to face said sensor rotor, and wherein said sensor rotor and said wheel speed sensor are disposed inside a brake drum of said parking brake means.

2. The built-in wheel speed sensor structure of claim 1, wherein said wheel speed sensor is disposed inside a hollow portion of said anchor pin.

3. The built in wheel speed sensor structure of claim 1, wherein said wheel means includes an axle shaft and a disc rotor connecting said axle shaft rotating integrally with said tire.

4. A built-in wheel speed sensor structure for a vehicle, comprising:
   (a) an internal gear-like sensor rotor means formed on a wheel rotating integrally with a tire; and
   (b) an electromagnetic wheel speed sensor means mounted on a fixed portion of a parking brake means, said wheel speed sensor means being disposed in an anchor pin on a bearing case, said wheel speed sensor means mounted in such a manner as to face said sensor rotor means, and wherein said sensor rotor means and said wheel speed sensor means are disposed inside a brake drum of said parking brake means.

* * * * *